United States Patent [19]
Walters

[11] 3,791,899
[45] Feb. 12, 1974

[54] METHOD OF MAKING ORNAMENTAL HOLLOW PLASTIC ARTICLES

[76] Inventor: Ben Walters, 4600 E. 11th Ave., Miami Beach, Fla. 33013

[22] Filed: Apr. 15, 1971

[21] Appl. No.: 134,187

[52] U.S. Cl. ............... 156/152, 156/242, 156/264, 156/304, 156/250, 264/113, 264/126, 264/152
[51] Int. Cl. ............................................. B29c 21/00
[58] Field of Search ... 264/112, 113, 126, 118, 308, 264/241, 152

[56] References Cited
UNITED STATES PATENTS
| | | | |
|---|---|---|---|
| 2,761,177 | 9/1956 | Walters | 264/126 |
| 3,414,642 | 12/1968 | Baum | 264/126 |
| 3,461,016 | 8/1969 | Irving, Jr. et al. | 264/126 |

Primary Examiner—Robert F. White
Assistant Examiner—J. R. Hall

[57] ABSTRACT

A process for making a hollow, ornamental, plastic article which has a smooth interior surface to which is bonded a randomly arranged layer of pellets forming the outer surface and extending outwardly therefrom. The pellets provide a radiating and lighting surface to dissipate heat from a light source positioned within the article and diffusing the light. The article is produced by placing a layer of plastic powder upon a heated surface of a mold in the form of the article, heating the layer to make it tacky and distributing a layer of pellets of a compatible plastic material over the tacky layer of powder, and heating the pellets until they become soft and cooling the mold and article so that the pellets adhere to each other and to the layer and removing the article from the mold.

5 Claims, 8 Drawing Figures

PATENTED FEB 12 1974 3,791,899

INVENTOR.
BEN WALTERS

BY Howard C. Miskin
ATTORNEY.

METHOD OF MAKING ORNAMENTAL HOLLOW PLASTIC ARTICLES

This invention relates to a method of making a hollow, ornamental plastic article and more particularly a method of making a hollow ornamental plastic article that is smooth on the inside surface and rough on the outside surface.

In the prior art when it was desired to form a hollow plastic article, a rotational molding was used in which a charge of a synthetic material was introduced into the cavity of a multi-part sectional hollow mold. The quantity of the charge was less than required to fill the cavity and form the skin of a desired thickness over the periphery of the cavity of the mold. The mold was then rotated about a plurality of axes at which time the mold with its charge was heated to gel and then fuse. Thereupon the mold was removed from the heating chamber, cooled to below the fusing temperature of the charge and the mold was opened and the finished article removed. The completed article had a fully fused, essentially homogeneous skin. Also, there has been shown in the prior art a method of making a porous hollow article made from plastic in which a granular material was introduced into the cavity and heated sufficiently to fuse the particles together but not sufficiently to melt. However, with this process, while the inner surface remains roughened, the outer surface was smooth similar to the surface of the mold.

The present invention produces a different product from that just described in which the outer surface, i.e. surface facing the viewer, is roughened and the article takes the shape of any form of the mold such as hollow, pyramidal, trapezoidal or the like. By the term hollow article is meant a self-form maintaining hollow molded article characterized by a shell having a smooth inner surface and having a course grained outer surface. The outer particles retain their before molding individuality and the particles are randomly arranged. These randomly arranged particles permit reflective passages of rays of light through the openings and diffuses any light passing through the particles, as well as radiating heat to a greater extent than heretofore and preventing any hot spots on the inner surface even though adjacent a large wattage bulb for continuous long periods.

Accordingly, it is an object of the present invention to provide a process for making an ornamental plastic article having a smooth interior surface and having granular, randomly located particles on the outer surface.

A further object of the present invention is to provide a process for making an ornamental plastic article having a smooth interior surface and a roughened outer surface utilizing inexpensive molds which faithfully conform to the mold surface.

Another object of the present invention is to provide a process for making a hollow plastic article of predetermined, reproducible form which has a smooth interior surface and a roughened outer surface, which outer surface provides good radiation of heat from an incandescent light bulb in the interior of the article, as well as providing unusual illuminating effects by diffusing the light therefrom.

A still further object of the present invention is to provide a process for producing a relatively inexpensive, highly ornamental plastic coated article having roughened heated surface of various shapes.

Yet another object of the present invention is to provide a process that produces a highly ornamental plastic article of reproducible form that accomplishes all of the above, which utilizes inexpensive and unskilled labor, and low cost materials, molds and apparatus.

Further objects and features of the present invention will become apparent when the following description is considered in connection with the annexed drawings in which.

The present tacky, in essence comprises a process for making an ornamental, hollow article by initially dispersing an even layer of powdered plastic material over a heated mold of the desired shape and heating the powder until it is tacky dispersing an even layer of plastic pellets over the tacky layer, heating the pellets until the adhere to themselves and the layer and cooling these pellets and layer to form an integral sheet and removing the sheet from the mold.

Figure 1:
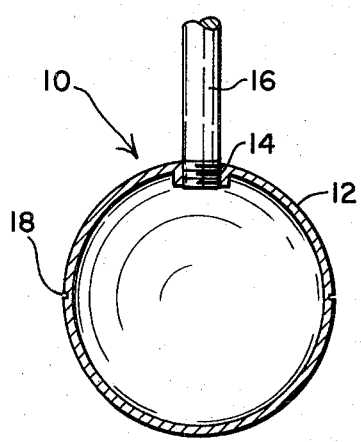
FIG. 1 is one type of mold.
Figure 2:
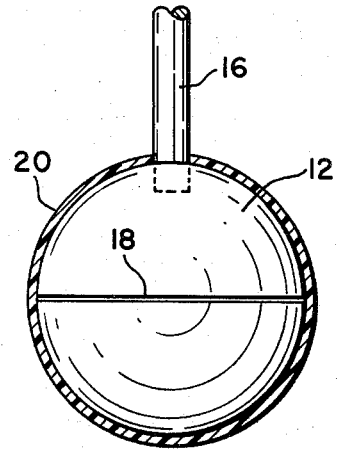
FIG. 2 illustrates coating the mold.
Figure 3:
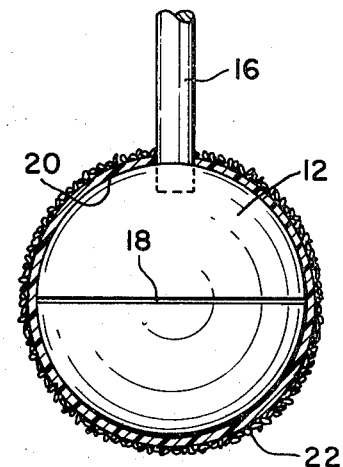
FIG. 3 illustrates the following step in which beads or roughened particles are distributed on the coating about the mold.
Figure 4:
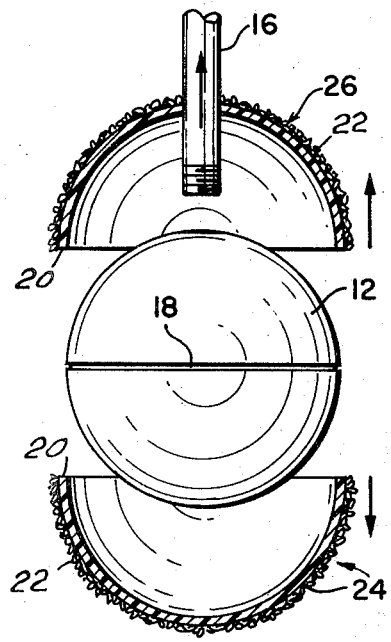
FIG. 4 illustrates removing the plastic article from the mold.

FIGS. 1-5 illustrate one form of the present invention to make a hollow ornamental article. FIG. 1 illustrates one mold for making a hollow spherical article in accordance with the present invention. A highly polished sphere 12 has a threaded opening 14 in which a threaded handle 16 is received. Disposed about the outer surface of sphere 12 is a groove 18 contained within a plane generally normal to the axis of handle 16. Sphere 12 is heated to a temperature above the melting point of the plastic to be used, in any convenient manner, such as in an oven, in high temperature liquid bath, radiation or the like. The outer periphery of sphere 12 is then coated with a uniform thin layer 20 of powdered plastic material. The powder becomes tacky and fuses on the heated mold surface to form a continuous uniform film. The temperature of the plastic coating material becoming tacky depends on the type of plastic used, the thickness of the coating to be applied and shape, mass and specific heat of the mold. The plastic coating is heated so as to remain tacky. Pellets or particles 22 of suitable plastic material are then spread evenly over the tacky layer 20. The particles 22 could come in a variety of shapes and forms, such as ovals, discs, stars, triangles, cylinders, turnings, etc., as well as colors, either uniform, mixed or variegated. However, preferably the particles comprising one charge are of similar form which is believed to provide the most pleasing appearance. By controlling the heat the particles become tacky and are bonded at their points of contact to form a sheet of semi-fused particles and which are also welded and fused to the tacky powdered layer 20. The particles retain some semblance of their original appearance as seen best in FIGS. 3 and 5.

The next step is cooling the mold and the exterior of the article to below the freezing temperature of the thermoplastic material. This could be more efficiently accomplished if the mold were hollow and liquid or air of different temperatures passed therethrough. Also the mold with the article can be immersed in a large cooling tank not shown. To remove the article, a sharp instrument such as a knife is used to cut along groove 18 and form a pair of hemispheres 24 and 26 so that both the lower portion 24 and the upper portion 26 can be removed from mold 12 and then reassembled by adhesive, heat or the like to form a single unitary article illustrated in FIG. 5. The opening 27 in hemisphere 26 allows entrance of a bulb 50, and allows a lamp to be fabricated in a conventional manner. The particles 22 provide varying degrees of light as well as diffusing the heat from the interior when a large wattage incandescent bulb is used.

Figure 5:
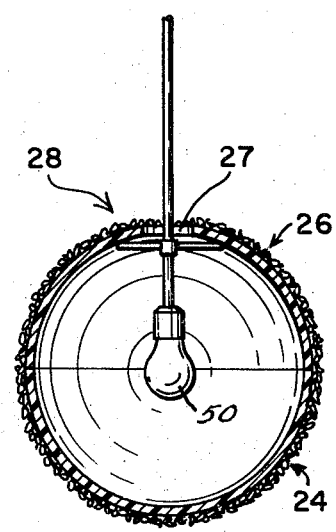
FIG. 5 illustrates the plastic article removed from the mold.

As shown in FIG. 5 the inner peripheral surface of article 28 is smooth and the outer peripheral surface is roughened which is in contrast with the conventional rotational molding articles heretofore made.

Figure 6:
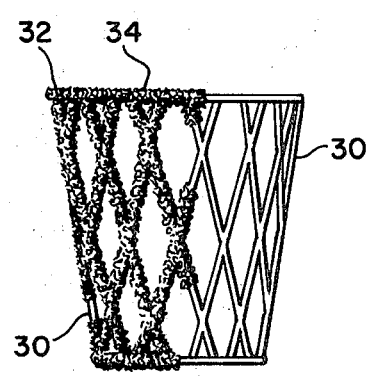
FIG. 6 illustrates an article coated in accordance with the process of this invention.

The present process can be used to provide unusual skin effects for varying shapes such as wastepaper baskets, coasters, decorative articles such as lamp bases, lamp shades and the like. The steps would be to have the metal wire or bars or strips formed in a predetermined shape, such as a wire basket or pot holder, illustrated in FIG. 6 in which the wire or metal 30 is heated, then powdered plastic material is disposed on the surface of the metal in an even thin layer and covering the surface. The powder is heated so that it becomes tacky and then pellets 34, of suitable plastic material are spread evenly over the tacky layer 32. These pellets when heated become softened and are fused or welded to each other and to the tacky powdered layer 32. Upon cooling, the tacky powdered layer is permanently and firmly adhered to the metal strips 30, as well as to the pellets 34 making a unitary bond to the metal thereby permitting a variety of intricate designs to be made from inexpensive soft metals and providing innumerable surface designs and appearance to the article.

Figure 7:
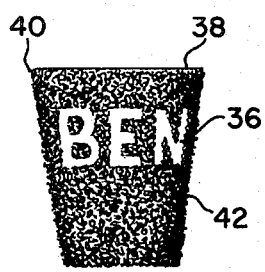
FIG. 7 illustrates another plastic coated article made in accordance with the present invention.
Figure 8:
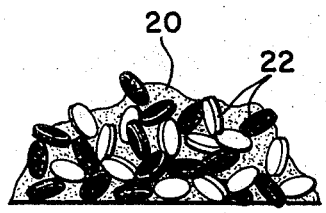
FIG. 8 is a fragmentary enlarged portion of a surface made by the disclosed process.

A still further embodiment is illustrated in FIG. 7 showing a glass or metal surface containing a design, here illustrated to show the letters BEN. This effect can be obtained by selectively placing plastic strips of material on the surface to be coated. The glass or metal article 38 is heated and a powdered plastic material is disposed on the upper surface of the glass in an even thin layer 40 covering the surface. The powder, of course, does not take on the decorative design 36. The layer 40 is heated so as to become tacky and the pellets 42 are placed on this layer to form a unitary sheet. The entire sheet is covered with these plastic pellets except for the decorative design 36. While the decorative design 36 is shown as letters, other designs, such as butterflies, birds, stars or the like, can be used. If desired, designs 36 can be coated with powder, heated until tacky and beads or pellets of a different color applied, to this surface. Hence, glasses, bottles, vases and the like can have a decorative surface bonded thereto with various designs appearing in the surface.

Also, different colored designs can be used where pellets of one color or shape can be applied to one type of surface and then removing the decorative or protective coating and then a second color or type of pellet can be applied to the other surface to provide variations in design or appearance. While clear or colorless plastic has been used and produces highly effective results, a mixture of varied-colored plastic granules will yield a variegated article and further adds additional coloring to the article itself.

While plastic materials such as high density polyethylene has been used effectively, other thermoplastic materials can be used such as cellulose acetate, cellulose acetate butyrate, polyvinyl, polypropylene, polybutylene, styrene, acrylic, ABS polymers, ethyl cellulose propionate, chlorinated polyether, polyvinyl chloride, polyvinylidene chloride, copolymers of methyl methacrylate and styrene, copolymers of butadiene and polystyrene, polyamide, and polycarbonate. Pigments or dyes in the material will yield any desired color in the finished product, and the use of differently colored coarse grained particles will engender a multi-colored appearance of the finished article. Further, the particles may be opaque, translucent or transparent, or a mixture thereof, all of which will have an influence upon the esthetic effect of the finished article. Any density of thermoplastic material may be utilized depending on the desired stiffness of the finished product.

The present invention eliminates any waste of plastic material since the powder and pellets are distributed only over the entire surface of the mold and any unadhered materials can be collected and reused.

The roughened outer surface allows effective dissipation of heat. For instance, a hollow sphere made with the present invention was placed over a naked 100 watt incandescent light bulb and dissipated the heat from the light bulb so as to prevent any hot spots on the article and prevented distortion of the article even when a 60 watt bulb burned continuously for 48 hours. Additionally, the particles diffused the rays of light differently than the inner skin, so as to provide a highly original lighting effect.

Additionally, the use of placing an electrostatic charge on the powder prior to disposing it on the outer surface of the mold, avoids initially heating the mold and allows uniform placement of the thin layer of powder and then heating the mold. The powder can be applied and positioned on the mold surface by electrostatic placement or spraying.

While the preferred embodiments have been described above, it is understood that many variations thereof will be readily apparent to those skilled in the art without departing from the spirit thereof. Therefore, it is intended that the foregoing description shall be deemed illustrative only and not construed in a limiting sense, the present invention being defined solely by the appended claims.

What I claim is:

1. A process for producing a smooth inner surface, rough outer surface, ornamental, hollow article, comprising:
   a. heating the outer surface of a male mold surface having the inner configuration of the hollow article;
   b. depositing as a first layer, a thin layer of a thermoplastic composition in a finely divided state on the heated outer surface of said mold;
   c. heating said first layer to cause the layer to fuse and become tacky;

d. depositing as a second layer a layer of coarse particles of plastic composition over said first tacky layer;
e. heating said second layer particles to become soft without complete coalescence thereof to form a layer of said coarse particle upon said first layer and be bonded thereto;
f. cooling said first and second layers to form coherent surface covering said mold surface; and
g. removing said coherent surface covering from said mold surface, whereby a smooth inner surface, rough outer surface hollow article is formed.

2. A process in accordance with claim 1 wherein step (g) entails cutting said coherent surface.

3. A process for producing a smooth inner surface, rough outer surface, ornamental, hollow article comprising:
a. heating the outer surface of a curved male mold surface having the inner configuration of the hollow article;
b. depositing as a first layer, a thin layer of a thermoplastic composition in finely divided state on the heated outer surface of said mold;
c. heating said first layer to cause the layer to fuse and become tacky;
d. depositing as a second layer, a layer of coarse particles of plastic composition over said first tacky layer;
e. heating said second layer particles to become soft without complete coalescence thereof to form a layer of said coarse particles upon said first layer and be bonded thereto;
f. cooling said first and second layers to form a coherent surface covering said mold surface;
g. cutting said coherent surface covering into substantially equally divided portions and removing said portions from said mold surface; and
h. rejoining said portions to form said hollow article.

4. The process in accordance with claim 3 wherein step (e) includes controlling the heating of the particles to produce bonding at their points of contact, which, when cooled by step (f) forms a sheet of semi-fused particles.

5. A process in accordance with claim 3 further including:
i. initially covering selected portion of the outer surface of said mold surface with a material to which said first layer is non-adherent.

* * * * *